US010994748B2

(12) United States Patent
Mortazavi et al.

(10) Patent No.: US 10,994,748 B2
(45) Date of Patent: May 4, 2021

(54) TRANSPORTATION NETWORK INFRASTRUCTURE FOR AUTONOMOUS VEHICLE DECISION MAKING

(71) Applicants: Nissan North America, Inc., Franklin, TN (US); Renault S.A.S., Boulogne-Billancourt (FR)

(72) Inventors: Ali Mortazavi, Walnut Creek, CA (US); Maarten Sierhuis, San Francisco, CA (US); Liam Pedersen, San Francisco, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/971,153

(22) PCT Filed: Feb. 28, 2018

(86) PCT No.: PCT/US2018/020288
§ 371 (c)(1),
(2) Date: Aug. 19, 2020

(87) PCT Pub. No.: WO2019/168530
PCT Pub. Date: Sep. 6, 2019

(65) Prior Publication Data
US 2021/0001882 A1 Jan. 7, 2021

(51) Int. Cl.
*B60W 60/00* (2020.01)
*G06K 9/00* (2006.01)
(Continued)

(52) U.S. Cl.
CPC ..... *B60W 60/0011* (2020.02); *G06K 9/00791* (2013.01); *G06K 9/6256* (2013.01);
(Continued)

(58) Field of Classification Search
None
See application file for complete search history.

(56) References Cited

U.S. PATENT DOCUMENTS 5,889,477 A  3/1999  Fastenrath
6,314,368 B1  11/2001  Gurmu et al.
(Continued)

FOREIGN PATENT DOCUMENTS

CN  1519541 A  8/2004
CN  1975801 A  6/2007
(Continued)

OTHER PUBLICATIONS

Karagiannis et al. (2011): Vehicle Networking: A Survey and Tutorial on Requirements, Architectures, Challenges, Standards and Solutions: IEEE Communications Surveys and Tutorials vol. 13 No. 4, Fourth Quarter. (Year: 2011).*

(Continued)

*Primary Examiner* — Abdhesh K Jha
(74) *Attorney, Agent, or Firm* — Young Basile Hanlon & MacFarlane, P.C.

(57) ABSTRACT

According to some implementations of the present disclosure, a method for controlling an autonomous vehicle is disclosed. The method includes traversing the transportation network in accordance with a route and receiving vehicle sensor data from one or more vehicle sensors of the autonomous vehicle. The method also includes determining that the autonomous vehicle has encountered an occlusion scenario based on the vehicle sensor data. In response to determining that the autonomous vehicle has encountered the occlusion scenario, the method includes transmitting a request for infrastructure data to an external resource via a communication network, receiving infrastructure data from the external resource, determining a control action for the autonomous vehicle to perform based on the infrastructure data and (Continued)

the vehicle sensor data, and controlling the autonomous vehicle based on the control action.

10 Claims, 6 Drawing Sheets

(51) Int. Cl.
    *G06N 20/00*     (2019.01)
    *H04W 4/029*     (2018.01)
    *G06K 9/62*     (2006.01)

(52) U.S. Cl.
    CPC ............ *G06N 20/00* (2019.01); *H04W 4/029* (2018.02); *B60W 2552/00* (2020.02)

(56) References Cited

U.S. PATENT DOCUMENTS

| | | | |
|---|---|---|---|
| 6,502,033 | B1 | 12/2002 | Phuyal |
| 8,972,145 | B2 | 3/2015 | Mahler et al. |
| 9,536,427 | B2 | 1/2017 | Tonguz et al. |
| 9,659,496 | B2 | 5/2017 | Massey et al. |
| 10,267,908 | B2 * | 4/2019 | Luders .................... G01S 13/04 |
| 10,604,120 | B2 * | 3/2020 | Newman ................. B08B 7/028 |
| 10,824,145 | B1 * | 11/2020 | Konrardy ........... G06Q 10/1095 |
| 2002/0026277 | A1 | 2/2002 | Kerner et al. |
| 2006/0009188 | A1 | 1/2006 | Kubota et al. |
| 2006/0038704 | A1 | 2/2006 | Poltorak |
| 2010/0114472 | A1 | 5/2010 | Oumi |
| 2011/0037618 | A1 | 2/2011 | Ginsberg et al. |
| 2011/0182475 | A1 | 7/2011 | Fairfield et al. |
| 2012/0139754 | A1 | 6/2012 | Ginsberg et al. |
| 2012/0274481 | A1 | 11/2012 | Ginsberg et al. |
| 2013/0096826 | A1 | 4/2013 | Krzanowski et al. |
| 2013/0166109 | A1 | 6/2013 | Ginsberg |
| 2014/0277986 | A1 | 9/2014 | Mahler et al. |
| 2016/0214607 | A1 | 7/2016 | Dolgov et al. |
| 2016/0231746 | A1 | 8/2016 | Hazelton et al. |
| 2016/0288791 | A1 | 10/2016 | Park |
| 2016/0349066 | A1 | 12/2016 | Chung et al. |
| 2017/0010613 | A1 | 1/2017 | Fukumoto |
| 2017/0113689 | A1 | 4/2017 | Gordon et al. |
| 2017/0123429 | A1 * | 5/2017 | Levinson ............. G05D 1/0214 |
| 2017/0154529 | A1 | 6/2017 | Zhao et al. |
| 2017/0185088 | A1 * | 6/2017 | Sakai ................. G06K 9/00832 |
| 2017/0208128 | A1 | 7/2017 | Stenneth et al. |
| 2017/0278390 | A1 | 9/2017 | Zydek et al. |
| 2017/0287335 | A1 | 10/2017 | Ansari |
| 2017/0308759 | A1 | 10/2017 | Mullen |
| 2017/0316333 | A1 | 11/2017 | Levinson et al. |
| 2017/0329332 | A1 * | 11/2017 | Pilarski ............. B60W 30/0956 |
| 2017/0351261 | A1 | 12/2017 | Levinson et al. |
| 2017/0369051 | A1 * | 12/2017 | Sakai ................... B60W 10/04 |
| 2019/0019416 | A1 * | 1/2019 | Perko ................... G05D 1/0088 |
| 2020/0128372 | A1 * | 4/2020 | Zhang .................... H04W 4/12 |
| 2020/0310425 | A1 * | 10/2020 | Ghose .................. B60W 30/09 |

FOREIGN PATENT DOCUMENTS

| | | |
|---|---|---|
| CN | 101436349 A | 5/2009 |
| CN | 102576491 A | 7/2012 |
| CN | 102927990 A | 2/2013 |
| CN | 103245351 A | 8/2013 |
| CN | 105185133 A | 12/2015 |
| CN | 105358397 A | 2/2016 |
| JP | H07-129893 A | 5/1995 |
| JP | 2007-256196 A | 10/2007 |
| JP | 2010-257108 A | 11/2010 |
| JP | 2012003543 A | 1/2012 |
| JP | 2012-181651 A | 9/2012 |
| WO | 2010/026630 A1 | 3/2010 |
| WO | 2015/129366 A1 | 9/2015 |

OTHER PUBLICATIONS

Federal Motor Vehicle Safety Standards, Federal Register, Jan. 12, 2017, vol. 82, No. 008, pp. 1-50.
Qualcomm and LG Bring 5G and Cellular-V2X Communications Into Vehicles, PR Newswire Association LLC, Feb. 23, 2017, pp. 1-3.
Koukoumidis et al., "SignalGuru: Leveraging Mobile Phones for Collaborative Traffic Signal Schedule Advisory", MobiSys '11, Jun. 28-Jul. 1, 2011; Proceedings of the 9th International Conference on Mobile Systems, Applications, and Services, pp. 127-140.
Protschky, Valentin, et al.; "Adaptive Traffic Light Prediction Via Kalman Filtering", IEEE Intelligent Vehicles Symposium (IV), Jun. 8, 2014, Dearborn, Michigan, USA, 7 pp.
Seredynski, Marcin, et al.; "Comparison of Green Light Optimal Speed Advisory Approaches", Proceedings of the 16th International IEEE Annual Conference on Intelligent Transportation Systems (ITSC 2013), The Hague, The Netherlands, Oct. 6, 2013, 6 pp.
Bodenheimer, Robert, et al.; "Enabling GLOSA for Adaptive Traffic Lights", 2014 IEEE Vehicular Networking Conference (VNC), 8 pp.
Barthauer, Mirko, et al.; "Evaluation of a signal state prediction algorithm for car to infrastructure applications", www.sciencedirect.com; Transportation Research Procedia 3 (2014) pp. 982-991, 10 pp.
Koukoumidis, Emmanouil, et al.; "Leveraging Smartphone Cameras for Collaborative Road Advisories", IEEE Transactions on Mobile Computing, vol. 11, No. 5, May 2012, 17 pp.
Katsaros, Konstantinos, et al.; "Performance study of a Green Light Optimized Speed Advisory (GLOSA) Application Using an Integrated Cooperative ITS Simulation Platform", 2011 IEEE, pp. 918-923, 6 pp.
Van Katwijk, R.T.; "Multi-Agent Look-Ahead Traffic-Adaptive Control", TRAIL Thesis Series T2008/3, The Netherlands TRAIL Research School, ISBN 978-90/5584-098-4, 2008, 173 pp.
Protschky, Valentin, et al.; "Extensive Traffic Light Prediction Under Real-World Conditions", 2014 IEEE, 5 pp.
Buckholz, Traffic Signal Phasing, Mar. 2015, https://nacto.org/docs/usdg/traffic_signal_phasing_buckholz.pdf.
Wikipedia, Feature Scaling, Oct. 2014, http://web.archive.org/web/20141 https://en.wikipedia.org/wiki/Feature_scaling.
Wikipedia, Machine Learning, Dec. 2014, https://web.archive.org/web/20 141208185048/https ://en.wikipedia.org/wiki/Machine_learning.

* cited by examiner

TRANSPORTATION NETWORK INFRASTRUCTURE FOR AUTONOMOUS VEHICLE DECISION MAKING

CROSS-REFERENCE TO RELATED APPLICATION(S)

This application is a national stage 371 filing of International Application Serial No. PCT/US2018/020288, filed Feb. 28, 2018, the entire disclosure of which is hereby incorporated by reference.

TECHNICAL FIELD

This disclosure relates to techniques for querying transportation network infrastructure to assist in the decision making of an autonomous vehicle.

BACKGROUND

In the field of autonomous vehicle control, an autonomous vehicle relies on vehicle sensor data (or "vehicle data") collected by the vehicle to determine a control action. Typically, an autonomous vehicle identifies a control action using the vehicle data as input to a decision-making module (e.g., a machine-learned model or a rule-based engine). The vehicle data is typically reliable, as an autonomous vehicle may have many different types of sensors (e.g., video cameras, radar sensors, and/or LIDAR sensors) to determine whether there are any obstacles and/or moving objects in the immediate route of the autonomous vehicle. An issue that arises, however, is when there may be one or more objects that occlude the sensory reach or "field of view" of the autonomous vehicle, where the sensory reach or "field of view" of the autonomous vehicle refers to an area proximate to the autonomous vehicle that the autonomous vehicle can sense via one or more of its sensors.

SUMMARY

Disclosed herein are implementations of a transportation network infrastructure to assist in the decision making of autonomous vehicles.

According to some implementations of the present disclosure, a method for controlling an autonomous vehicle traversing a transportation network is disclosed. The method includes traversing, by the autonomous vehicle, the transportation network in accordance with a route and receiving, by one or more processors of the autonomous vehicle, vehicle sensor data from one or more vehicle sensors of the autonomous vehicle. The method also includes determining, by the one or more processors, that the autonomous vehicle has encountered an occlusion scenario based on the vehicle sensor data. In response to determining that the autonomous vehicle has encountered the occlusion scenario, the method includes transmitting, by the one or more processors, a request for infrastructure data to an external resource via a communication network, receiving, by the one or more processors, infrastructure data from the external resource, determining, by the one or more processors, a control action for the autonomous vehicle to perform based on the infrastructure data and the vehicle sensor data, and controlling, by the one or more processors, the autonomous vehicle based on the control action. The request for infrastructure data indicates a geolocation of the autonomous vehicle and the infrastructure data is based on infrastructure sensor data providing one or more infrastructure sensors disposed along the transportation network that are proximate to the geolocation of the autonomous vehicle.

According to some implementations of the present disclosure, determining that the autonomous vehicle has encountered an occlusion scenario comprises determining one or more candidate actions based on the vehicle sensor data, comparing the respective confidence score of each candidate action to a threshold, and in response to determining that all of the respective confidence scores are less than the threshold, determining that the autonomous vehicle has entered the occlusion scenario. Each candidate action has a respective confidence score attributed thereto that indicates a degree of confidence in the candidate action given the vehicle sensor data.

According to some implementations of the present disclosure, determining that the autonomous vehicle has encountered an occlusion scenario comprises determining one or more candidate actions based on the vehicle sensor data and comparing the respective confidence score of each candidate action to a threshold. Furthermore, in response to determining that a particular confidence score of the respective confidence scores is greater than the threshold, determining that the autonomous vehicle has encountered an occlusion scenario further includes selecting a candidate action to which the particular confidence score corresponds as the control action and in response to determining that the control action does not advance the autonomous vehicle past a current scenario, determining that the vehicle is in the occlusion scenario.

According to some implementations of the present disclosure, determining the control action comprises inputting the vehicle sensor data and the infrastructure data into a machine-learned model that is trained to output candidate actions in response to receiving input data, wherein each candidate action has a respective confidence score associated therewith. Furthermore, in some implementations, each instance of infrastructure data has a sensor reliability score attributed thereto indicating a degree of reliability of the infrastructure sensor that output the infrastructure data. In these implementations, determining the control action may further comprise inputting the sensor reliability score of each instance of the infrastructure data into the machine-learned model with the instance of infrastructure data. According to some implementations of the disclosure, each instance of infrastructure data includes location data, wherein the location data indicates a location of the infrastructure sensor that transmitted the instance of infrastructure data. In these implementations, determining the control action may further comprise inputting the location data of each instance of the infrastructure data into the machine-learned model with the instance of infrastructure data.

According to some implementations of the present disclosure, the method further comprises, in response to determining that the autonomous vehicle has encountered the occlusion scenario: determining an approximate location of an occluded portion of the transportation network based on the vehicle sensor data and including the approximate location in the request for infrastructure data.

According to some implementations of the present disclosure, infrastructure data includes an occupation history of a corresponding infrastructure sensor, wherein the occupation history includes one or more time-stamps indicating a time when a respective area monitored by the corresponding infrastructure sensor was occupied by an object.

According to some implementations of the present disclosure, the method further includes receiving, by the external resource, the request for infrastructure data, determining, by the external resource, a location corresponding to the request, obtaining, by the external resource, the infrastructure data corresponding to the location corresponding to the request, and transmitting, by the external resource, the infrastructure data to the autonomous vehicle. In some of these implementations, obtaining the infrastructure data comprises identifying, by the external resource, an infrastructure sensor that monitors the location corresponding to the request and querying, by the external resource, an infrastructure sensor object that maintains an occupation history of the infrastructure sensor, wherein the occupation history includes one or more time-stamps indicating a time when a respective area monitored by the infrastructure sensor was occupied by an object.

According to some implementations of the present disclosure, an autonomous vehicle is disclosed. The autonomous vehicle may include a sensor system having one or more vehicle sensors and one or more processors that execute computer-readable instructions. When executed, the computer-readable instructions cause the one or more processors to receive vehicle sensor data from the one or more vehicle sensors of the sensor system as the autonomous vehicle traverses a transportation network and determine that the autonomous vehicle has encountered an occlusion scenario based on the vehicle sensor data. In response to determining that the autonomous vehicle has encountered the occlusion scenario, the instructions cause the one or more processors to transmit a request for infrastructure data to an external resource via a communication network, receive infrastructure data from the external resource determine a control action for the autonomous vehicle to perform based on the infrastructure data and the vehicle sensor data, and control the autonomous vehicle based on the control action. The request for infrastructure data indicates a geolocation of the autonomous vehicle and the infrastructure data is based on infrastructure sensor data providing one or more infrastructure sensors disposed along the transportation network that are proximate to the geolocation of the autonomous vehicle.

According to some implementations of the present disclosure, determining that the autonomous vehicle has encountered an occlusion scenario comprises determining one or more candidate actions based on the vehicle sensor data, comparing the respective confidence score of each candidate action to a threshold, and in response to determining that all of the respective confidence scores are less than the threshold, determining that the autonomous vehicle has entered the occlusion scenario. Each candidate action has a respective confidence score attributed thereto that indicates a degree of confidence in the candidate action given the vehicle sensor data.

According to some implementations of the present disclosure, determining that the autonomous vehicle has encountered an occlusion scenario comprises determining one or more candidate actions based on the vehicle sensor data and comparing the respective confidence score of each candidate action to a threshold. Furthermore, in response to determining that a particular confidence score of the respective confidence scores is greater than the threshold, determining that the autonomous vehicle has encountered an occlusion scenario further includes selecting a candidate action to which the particular confidence score corresponds as the control action and in response to determining that the control action does not advance the autonomous vehicle past a current scenario, determining that the vehicle is in the occlusion scenario.

According to some implementations of the present disclosure, determining the control action comprises inputting the vehicle sensor data and the infrastructure data into a machine-learned model that is trained to output candidate actions in response to receiving input data, wherein each candidate action has a respective confidence score associated therewith. Furthermore, in some implementations, each instance of infrastructure data has a sensor reliability score attributed thereto indicating a degree of reliability of the infrastructure sensor that output the infrastructure data. In these implementations, determining the control action may further comprise inputting the sensor reliability score of each instance of the infrastructure data into the machine-learned model with the instance of infrastructure data. According to some implementations of the disclosure, each instance of infrastructure data includes location data, wherein the location data indicates a location of the infrastructure sensor that transmitted the instance of infrastructure data. In these implementations, determining the control action may further comprise inputting the location data of each instance of the infrastructure data into the machine-learned model with the instance of infrastructure data.

According to some implementations of the present disclosure, the computer-readable instructions further cause the one or more processors to determine an approximate location of an occluded portion of the transportation network based on the vehicle sensor data and include the approximate location in the request for infrastructure data, in response to determining that the autonomous vehicle has encountered the occlusion scenario.

According to some implementations of the present disclosure, infrastructure data includes an occupation history of a corresponding infrastructure sensor, wherein the occupation history includes one or more time-stamps indicating a time when a respective area monitored by the corresponding infrastructure sensor was occupied by an object.

According to some implementations of the present disclosure a vehicle control server is disclosed. The vehicle control server may include a storage device that stores a transportation network datastore that stores transportation network data. The transportation network data includes locations of a plurality of infrastructure sensors disposed along a transportation network and respective identifiers of the plurality of infrastructure sensors. The vehicle control server further includes a communication unit configured to communicate with external devices via a communication network and one or more processors that execute computer-readable instructions. When executed, the instructions cause the one or more processors to maintain a plurality of infrastructure sensor objects. Each infrastructure sensor object corresponds to a respective infrastructure sensor of the plurality of infrastructure sensors and is configured to receive an occupancy signal from the corresponding infrastructure sensor and in response to the occupancy signal indicating that the area monitored by the corresponding infrastructure sensor is occupied, update an occupancy history of the infrastructure sensor to indicate that the area being monitored was occupied. The occupancy signal indicates whether an area monitored by the corresponding infrastructure sensor is occupied by an object and the occupancy history indicates any detected occupancy events during a fixed timeframe. The instructions further cause the one or more processors to receive a request for infrastructure data from an autonomous vehicle via the communication unit, the request for infrastructure data including a location, determine a relevant infrastructure sensor from the plurality of sensors based on the location included in the request for infrastructure data, query an infrastructure sensor object corresponding to the relevant infrastructure sensor to obtain an occupancy history of the relevant infrastructure sensor; and transmit the occupancy history to the autonomous vehicle.

According to some of implementations of the present disclosure, updating an occupancy history of the infrastructure sensor includes detecting an occupancy event based on the occupancy signal, generating a time-stamp corresponding to the occupancy event, and inserting the time-stamp into the occupancy history of the infrastructure sensor.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Techniques for handling occlusion scenarios encountered by an autonomous vehicle (also referred to as a "vehicle") are disclosed herein. An occlusion scenario may refer to a situation where the sensor system of an autonomous vehicle is unable to obtain reliable vehicle sensor data (also referred to as "vehicle data") for the autonomous vehicle to determine a control action because of an obstacle or other object that is obstructing the sensors of the vehicle. For example, a building may obstruct the field of view of a video camera of an autonomous vehicle when the vehicle is attempting to turn left onto a road. If the building is blocking the field of view of the camera from the left (where vehicles may be due to intersect the route of the autonomous vehicle), the autonomous vehicle may be in a situation where it is unable to determine whether to turn or to continue to wait. In another example, an autonomous vehicle may be at or near a crest of a hill, whereby the vehicle cannot determine if any vehicles are coming over the hill.

Upon encountering an occlusion scenario, an autonomous vehicle may transmit a request for infrastructure data to an external resource. The request may indicate a location of the autonomous vehicle and/or an estimated location of the occlusion scenario. The external resource may be one or more computing devices in communication with infrastructure sensors (e.g., inductive-loop traffic sensors, video cameras, radar sensors, audio sensors, and LIDAR sensors) disposed along a transportation network via a communication network (e.g., the Internet or a cellular network). The infrastructure sensors transmit infrastructure data to the external resource. The infrastructure data can indicate whether there is an object (e.g., a vehicle) in the area being monitored by the infrastructure sensor.

It is noted that the techniques described herein can be applied to handle additional scenarios. In some implementations, the infrastructure data may be used for long term planning (e.g., minutes or miles ahead). In these implementations, the autonomous vehicle may request infrastructure data based on the upcoming route to determine whether there are any conditions to avoid along the upcoming route of the vehicle.

In response to the request, the external resource may transmit infrastructure data to the autonomous vehicle. The autonomous vehicle can utilize the infrastructure data to determine a control action for the vehicle to undertake. In particular, the autonomous vehicle can supplement the vehicle data obtained from the sensors with the infrastructure data to determine the control action. For example, in some implementations, the autonomous vehicle can input the infrastructure data and the vehicle data into a machine-learned model to determine the control action.

Figure 1:
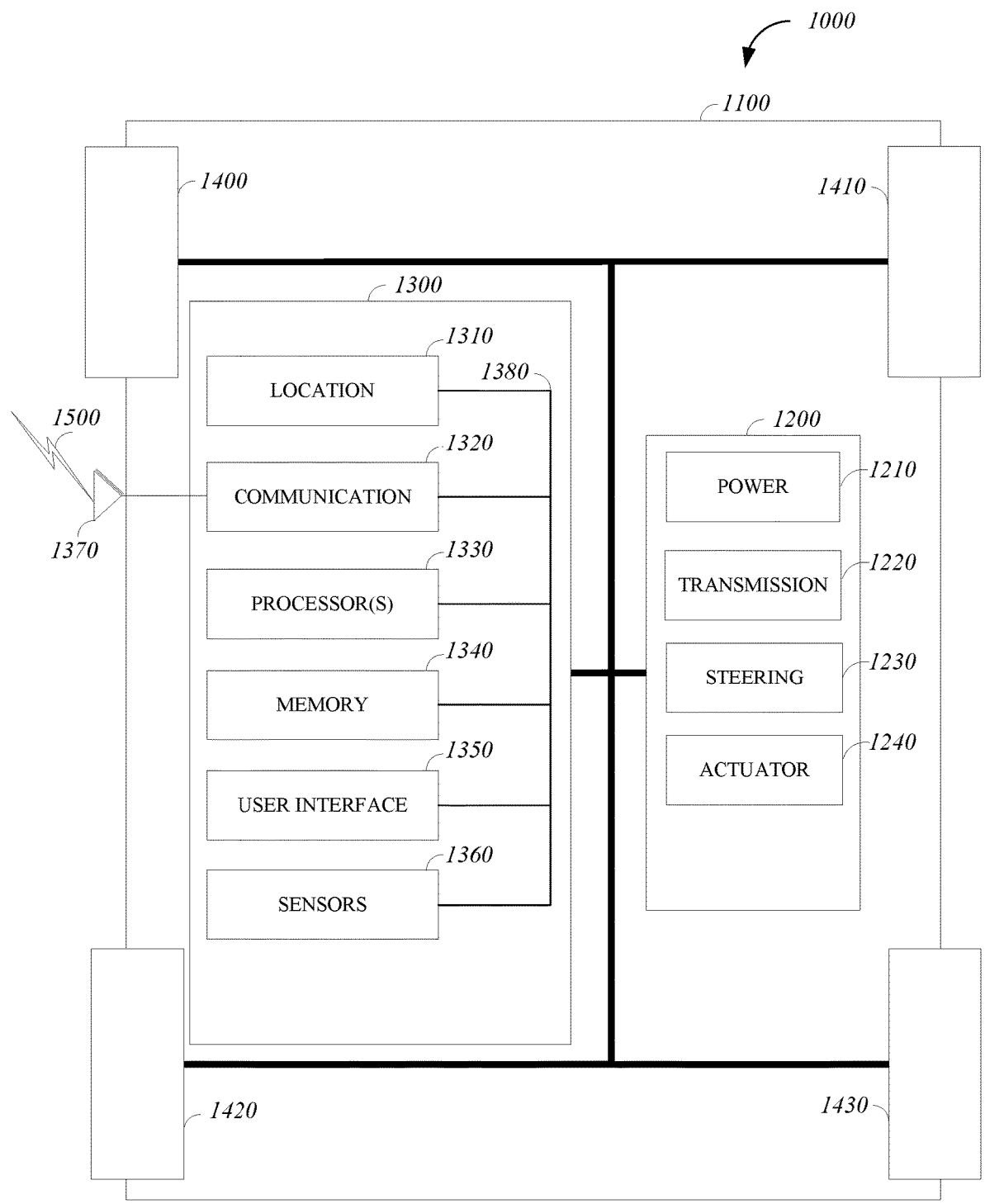
FIG. 1 is a schematic of an example of a portion of a vehicle in which the aspects, features, and elements disclosed herein may be implemented.

FIG. 1 is a diagram of an example of an autonomous vehicle 1000 (also referred to as "vehicle" 1000) in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240, or both. The steering unit 1230 may be controlled by the controller 1300, the vehicle actuator 1240, or both, and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor system 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit, and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor system 1360, the electronic communication interface 1370, or any combination thereof can be integrated in one or more electronic units, circuits, or chips.

In some embodiments, the processor 1330 includes any device or combination of devices, now existing or hereafter developed, capable of manipulating or processing a signal or other information, including optical processors, quantum processors, molecular processors, or a combination thereof. For example, the processor 1330 may include one or more special-purpose processors, one or more digital signal processors, one or more microprocessors, one or more controllers, one or more microcontrollers, one or more integrated circuits, one or more Application-Specific Integrated Circuits, one or more Field-Programmable Gate Arrays, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor system 1360, the powertrain 1200, or any combination thereof. For example, the processor 1330 may be operatively coupled with the memory 1340 via a communication bus 1380.

In some embodiments, the processor 1330 may be configured to execute instructions including instructions for remote operation, which may be used to operate the vehicle 1000 from a remote location including an external resource. The instructions for remote operation may be stored in the vehicle 1000 or received from an external source such as a traffic management center, or server computing devices, which may include cloud-based server computing devices.

The memory 1340 may include any tangible non-transitory computer-usable or computer-readable medium capable of, for example, containing, storing, communicating, or transporting machine-readable instructions or any information associated therewith, for use by or in connection with the processor 1330. The memory 1340 may include, for example, one or more solid-state drives, one or more memory cards, one or more removable media, one or more read-only memories, one or more random-access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna (as shown), a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both transmit and receive, via any wired or wireless communication medium, such as radio frequency (RF), ultraviolet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, and a sensor. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch-based communication with the person.

The sensor system 1360 may include one or more sensors, such as an array of sensors, which may be operable to provide information that may be used to control the vehicle. The sensor system 1360 can provide information regarding current operating characteristics of the vehicle or its surroundings. The sensor system 1360 includes, for example, a speed sensor, acceleration sensors, a steering-angle sensor, traction-related sensors, braking-related sensors, or any sensor, or combination of sensors, that is operable to report information regarding some aspect of the current dynamic situation of the vehicle 1000.

In some embodiments, the sensor system 1360 may include sensors that are operable to obtain information regarding the physical environment surrounding the vehicle 1000. For example, one or more sensors detect road geometry and obstacles, such as fixed obstacles, vehicles, cyclists, and pedestrians. In some embodiments, the sensor system 1360 can be or include one or more video cameras, LIDAR systems, radar systems, laser-sensing systems, infrared-sensing systems, acoustic-sensing systems, or any other suitable type of on-vehicle environmental sensing device, or combination of devices, now existing or hereafter developed. In some embodiments, the sensor system 1360 and the location unit 1310 are combined.

Although not shown separately, the vehicle 1000 may include a vehicle control system. For example, the controller 1300 may include a vehicle control system. The vehicle control system may be operable to obtain information describing a current state of the vehicle 1000 and a route planned for the vehicle 1000, and, based on this information, to determine and optimize a trajectory for the vehicle 1000. In some embodiments, the vehicle control system outputs signals operable to control the vehicle 1000, such that the vehicle 1000 follows the trajectory that is determined by the vehicle control system. For example, the output of the vehicle control system can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230; a propelled wheel, which is torqued to propel the vehicle 1000 under control of the transmission 1220; or a steered and propelled wheel that steers and propels the vehicle 1000.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
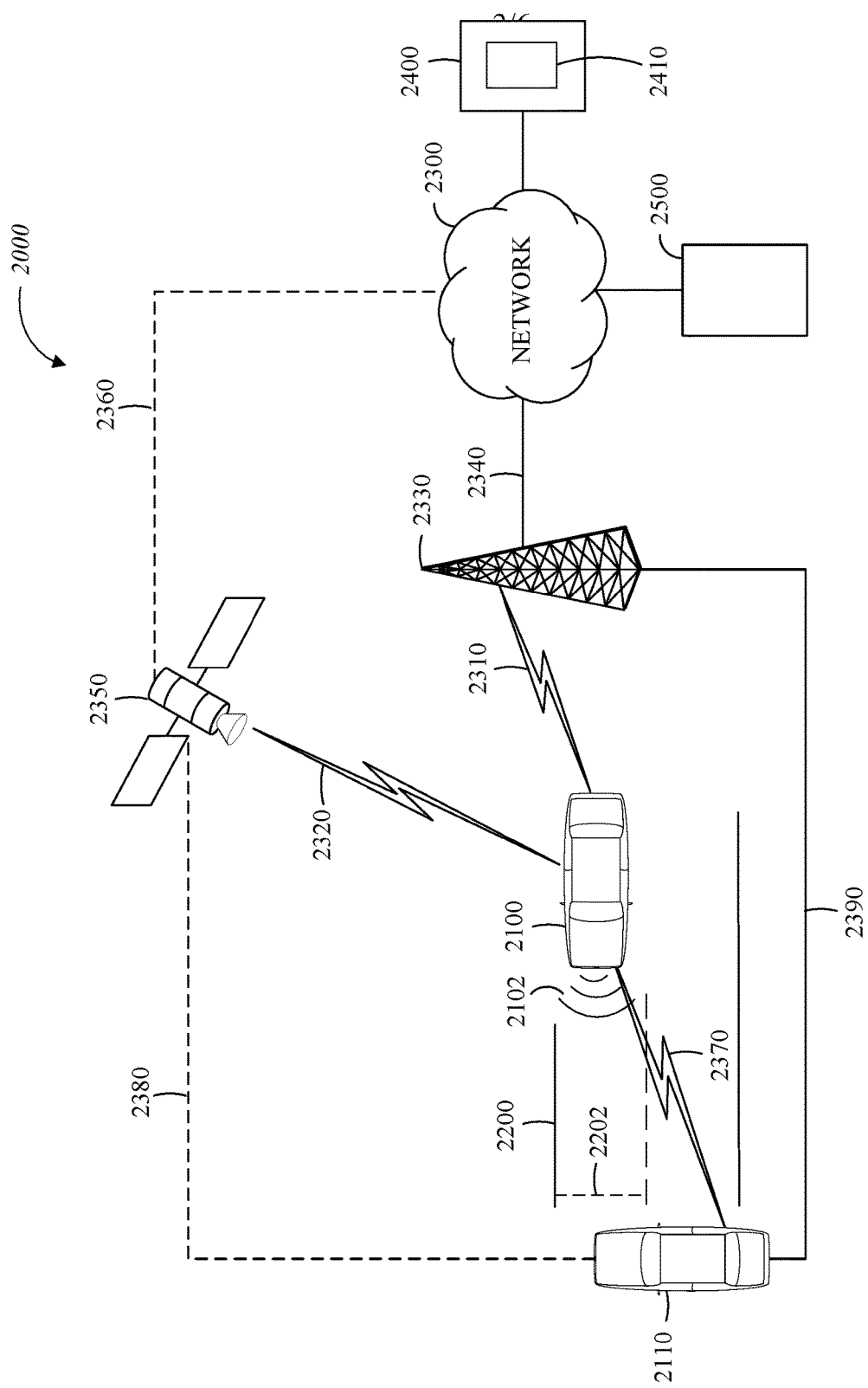
FIG. 2 is a schematic of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments, the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an external resource 2400. For example, the vehicle 2100 or the external object 2110 may receive information, such as information representing the transportation network 2200, from the external resource 2400 via the electronic communication network 2300.

The external resource 2400 includes a controller apparatus 2410 which includes some or all of the features of the controller 1300 shown in FIG. 1. The controller apparatus 2410 can monitor and coordinate the movement of vehicles. The controller apparatus 2410 may monitor the vehicle state data of any vehicle in communication with the controller apparatus 2410. The controller apparatus 2410 may maintain the vehicle state of each vehicle, and may determine a route for each vehicle based on the vehicle state of the vehicle. Furthermore, the controller apparatus can monitor the vehicle state data of a collection of vehicles to detect the occurrence of a traffic condition (e.g., a traffic jam). Upon determining the occurrence of a traffic condition, the controller apparatus 2410 groups vehicles that are likely to encounter the traffic condition (i.e., vehicles whose routes intersect the traffic condition) into different subgroups based on one or more factors. The different subgroups are then rerouted through different waypoints, so as to efficiently route the vehicles around the traffic condition. The controller apparatus 2410 can receive vehicle state data and external data, including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices, such as the vehicle 2100, the external object 2110, or a server computing device 2500, via a wireless communication link, such as the wireless communication link 2380, or a wired communication link, such as the wired communication link 2390.

The server computing device 2500 may include one or more server computing devices that may exchange (send or receive) state signal data with one or more vehicles or computing devices, including the vehicle 2100, the external object 2110, or the external resource 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of facilitating electronic communication.

A vehicle, such as the vehicle 2100, or an external object, such as the external object 2110, may communicate with another vehicle, external object, or the external resource 2400. For example, a host, or subject, vehicle 2100 may receive one or more automated inter-vehicle messages, such as a basic safety message (BSM), from the external resource 2400, via a direct communication link 2370, or via an electronic communication network 2300. For example, the external resource 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 periodically transmits one or more automated inter-vehicle messages based on a defined interval, such as one hundred milliseconds.

Automated inter-vehicle messages may include vehicle identification information; geospatial state information, such as longitude, latitude, or elevation information; geospatial location accuracy information; kinematic state information, such as vehicle acceleration information, yaw rate information, speed information, vehicle heading information, braking system state data, throttle information, steering wheel angle information, or vehicle routing information; or vehicle operating state information, such as vehicle size information, headlight state information, turn signal information, wiper state data, transmission information, or any other information, or combination of information, relevant to the transmitting vehicle's state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the external resource 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350 or other non-terrestrial communication device. The satellite 2350, which may include a computing device, may be configured to communicate with the vehicle 2100, with the electronic communication network 2300, with the external resource 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the Internet Protocol (IP), the real-time transport protocol (RTP), the HyperText Transport Protocol (HTTP), or a combination thereof. Although shown as a single unit, an electronic communication network can include any number of interconnected elements.

In some embodiments, the vehicle 2100 communicates with the external resource 2400 via the electronic communication network 2300, access point 2330, or satellite 2350. The external resource 2400 may include one or more computing devices, which are able to exchange (send or receive) data from: vehicles, such as the vehicle 2100; external objects, including the external object 2110; or computing devices, such as the server computing device 2500.

In some embodiments, the vehicle 2100 identifies a portion or condition of the transportation network 2200. For example, the vehicle 2100 may include one or more on-vehicle sensors 2102, such as the sensor system 1360 shown in FIG. 1, which includes a speed sensor, a wheel-speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the external resource 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with an external resource 2400 via the electronic communication network 2300, the vehicle 2100 (and external object 2110) may communicate with the external resource 2400 via any number of direct or indirect communication links. For example, the vehicle 2100 or external object 2110 may communicate with the external resource 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
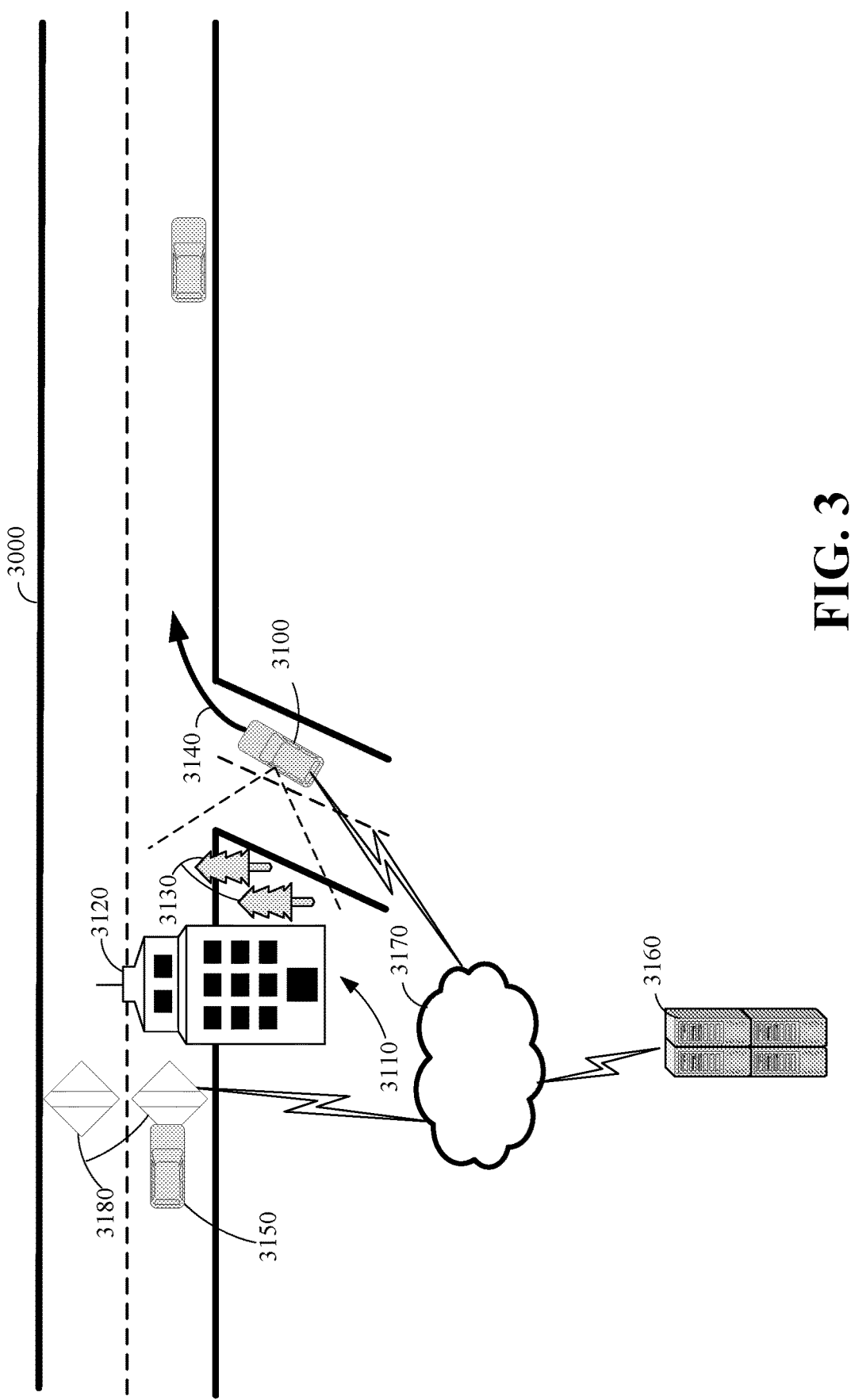
FIG. 3 illustrates an example autonomous vehicle that has encountered an occlusion scenario.

FIG. 3 illustrates an example of an autonomous vehicle 3100 that has encountered an occlusion scenario 3110 while traversing a transportation network 3000. In the illustrated example, a building 3120 and trees 3130 are blocking the sensing of the autonomous vehicle 3100. As a result, the autonomous vehicle 3100 is unable to determine whether to proceed along its proposed path 3140. In particular, the building 3120 and the trees 3130 prevent the sensor system of the vehicle 3100 from determining whether there is a potential moving object (e.g., vehicle 3150) that is likely to intersect with the path 3140 of the autonomous vehicle 3100. Furthermore, had the occlusion scenario 3110 blocked the sensory reach of the autonomous vehicle 3100 in the direction in which the autonomous vehicle 3100 is traveling, the autonomous vehicle 3100 would not be able to determine whether a non-moving or slow-moving obstacle (not shown) was in the immediate path 3140 of the vehicle 3100. As a result of encountering an occlusion scenario 3110, the autonomous vehicle 3100 may be unable to determine a control action for the vehicle to undertake based on the vehicle data collected by the sensor system of the autonomous vehicle 3100. In some scenarios, the autonomous vehicle may determine a control action that results in being unable to negotiate a desirable action. For example, the control action may instruct the autonomous vehicle to wait longer, to inch forward, or move very slowly. For purposes of discussion, a control action that causes the vehicle to wait longer, inch forward, or proceed slowly may all be considered a situation where the vehicle was unable to determine a control action. Put another way, the vehicle is unable to determine a control action that results in the autonomous vehicle successfully moving past the occlusion scenario. It is further noted that while the occlusion scenario in FIG. 3 is a result of objects blocking the view of the autonomous vehicle 3100, an occlusion scenario may be caused by the geometry of the transportation network as well. For example, if the angle of an intersection precludes the autonomous vehicle 3100 from sensing other objects that are traveling on the transportation network, an occlusion scenario may also be encountered.

In the scenario depicted in FIG. 3, the autonomous vehicle 3100 is unable to determine whether a vehicle 3150 or any other moving object is set to intersect with its path 3140 because of the building 3120 and trees 3130 blocking the sensory reach or field of view of the autonomous vehicle 3100. In this scenario, the autonomous vehicle 3100 may input the vehicle data obtained from the sensor system of the vehicle into an action determination module of the vehicle. An action determination module may be any component of the autonomous vehicle 3100 that is configured to determine one or more candidate actions, where each candidate action defines a different action that the vehicle may undertake and may have a respective confidence score attributed thereto. The confidence score may be an indication of a degree of confidence the action determination module has in the candidate action given the data that was provided. In some implementations, the autonomous vehicle will refrain from selecting any of the candidate actions if the confidence scores of each of the candidate actions is below a threshold. Put another way, the autonomous vehicle will refrain from taking an action if the action determination module does not have a requisite degree of confidence in any of the candidate actions. It is noted that the vehicle may take conservative actions such as waiting longer, inching forward, or moving slowly. In these scenarios, the vehicle may still determine that it is unable to determine a control action, as the control action that is undertaken does not advance the vehicle past the occlusion scenario.

When the autonomous vehicle 3100 encounters an occlusion scenario that affects the ability of the action determination module of the autonomous vehicle 3100 to determine a control action based on vehicle data alone, the autonomous vehicle 3100 may request infrastructure data from an external resource 3160. The external resource 3160 may be a collection of one or more computing devices that collect data from vehicles traversing the transportation network 3000 and/or from infrastructure sensors 3180. An infrastructure sensor 3180 may be any sensor that is disposed along or proximate to the transportation network 3000 and that communicates with the external resource 3160. Examples of infrastructure sensors 3180 can include, but are not limited to, inductive-loop traffic sensors (or "loop sensors"), video cameras, radar sensors, audio sensors, and LIDAR sensors. The request for infrastructure data may include a geolocation of the autonomous vehicle 3100 and/or an estimated location corresponding to the occlusion scenario (e.g., an estimated location of the blocked portion of the transportation network). In response to receiving the request, the external resource returns infrastructure data corresponding to the location of the vehicle/location of the occlusion scenario. In some implementations, the infrastructure data may indicate a location of a detection event and a timestamp. For example, as the vehicle 3150 passes the infrastructure sensor 3180, the infrastructure sensor 3180 may transmit a signal to the external resource 3160 indicating that the sensor-space is occupied via a communication network 3170. For example, the infrastructure sensor 3180 may transmit a first signal value when the sensor-space is occupied and a second signal value when the sensor-space is unoccupied. In receiving the signal from the infrastructure sensor 3180 and knowing the geolocation of the infrastructure sensor 3180, the external resource 3160 may determine when a potentially moving object passed over the infrastructure sensor. For example, the external resource 3160 may determine a time-stamp corresponding to the occupancy event. In response to receiving a request for infrastructure data, where the request indicates a location of the autonomous vehicle and/or the occlusion scenario, the external resource 3160 may retrieve any spatiotemporally-relevant data relating to the request. For instance, the external resource 3160 may include the locations and time-stamps of any occupancy events in the previous five seconds (or any other suitable time duration) in the infrastructure data that is responsive to the request. Furthermore, the external resource may provide speed information relating to objects detected by the infrastructure sensor. The speed information may be determined by the infrastructure sensors 3180 or may be interpolated by the external resource 3160 based on infrastructure data received from two or more infrastructure sensors 3160.

The autonomous vehicle 3100 receives the infrastructure data from the external resource 3160 and again determines one or more candidate actions based on the vehicle data obtained from the vehicle sensors and the infrastructure data received from the external resource 3160. For example, the autonomous vehicle 3100 may input the vehicle data and the infrastructure data to the action determination module, which in turn outputs one or more candidate actions with confidence scores attributed to each candidate action. Assuming one or more of the candidate actions are greater than the threshold, the autonomous vehicle can select the candidate action with the highest confidence score (or another candidate action with a requisite confidence score) as the control action. In response to the selection of the control action, the autonomous vehicle can execute the control action.

It is noted that in some scenarios, the autonomous vehicle 3100 may still be unable to select a candidate action that progresses the vehicle past the occlusion scenario (e.g., the vehicle continues to wait or inch forward), after receiving the infrastructure data. In these scenarios, the autonomous vehicle 3100 may continue to receive infrastructure data until it is able to select a control action. Alternatively, the autonomous vehicle 3100 may relinquish control of the vehicle to a passenger in the vehicle.

Figure 4:
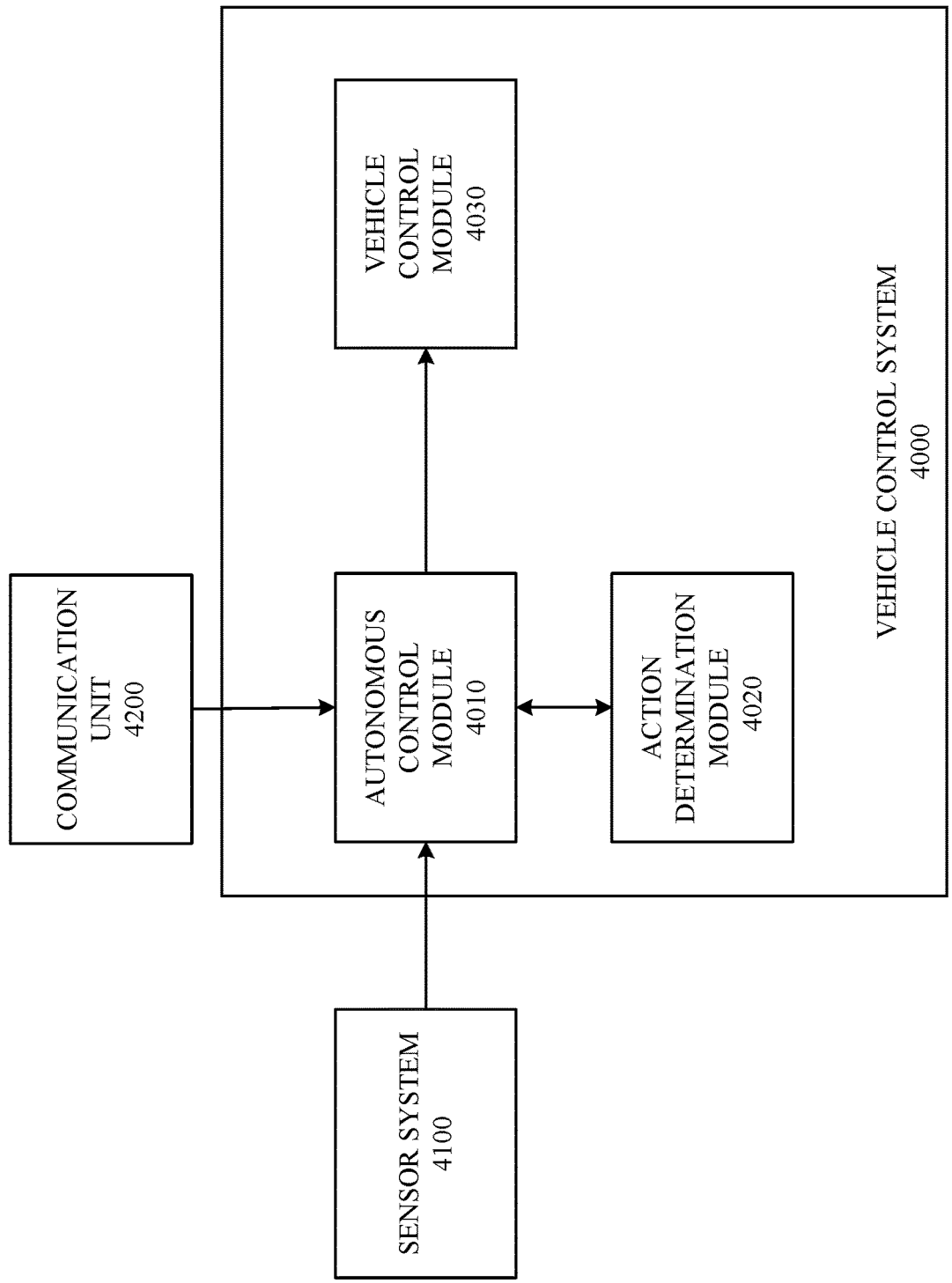
FIG. 4 is a schematic of an example vehicle control system of an autonomous vehicle according to some implementations of the present disclosure.

FIG. 4 illustrates an example vehicle control system 4000 of an autonomous vehicle (e.g., the autonomous vehicle 1000 of FIG. 1, autonomous vehicle 3100 of FIG. 3) according to some implementations of the present disclosure. The vehicle control system 4000 may be executed by one or more processors (e.g., the processor 1330 of FIG. 1) of the autonomous vehicle. The vehicle control system 4000 may include an autonomous control module 4010, an action determination module 4020, and a vehicle control module 4030. The vehicle control system 4000 may receive input from a sensor system 4100 (e.g., the sensor system 1360 of FIG. 1) and a communication unit 4200 (e.g., the communication unit 1320 of FIG. 1).

In some implementations, the autonomous control module 4010 receives vehicle data from the sensor system 4100. For example, the autonomous control module 4010 may receive vehicle data from one or more of video cameras, LIDAR systems, radar systems, laser-sensing systems, infrared-sensing systems, acoustic-sensing systems, or any other suitable type of on-vehicle environmental sensing device, or combination of devices. The autonomous control module 4010 can pass the vehicle data to the action determination module 4020.

In some implementations, the action determination module 4020 receives vehicle data (and in some scenarios, infrastructure data), and determines one or more candidate actions based on the received data. The action determination module 4020 may implement any suitable techniques for determining the candidate actions. For example, the action determination module 4020 may implement a machine-learned model and/or a rules-based engine that determine candidate actions based on the received data. Examples of machine-learned models include Partially Observable Markov Decision Processes, neural networks, deep neural networks, decision trees, and the like. In response to received data, the action determination module 4020 determines one or more candidate actions. In the context of controlling an autonomous vehicle, examples of candidate actions may include, but are not limited to, "turn right," "turn left," "veer left," "veer right," "continue straight," "accelerate," "decelerate," or "stop."

In some implementations, the action determination module 4020 can input the received data into a machine-learned model or rules-based engine to determine the one or more candidate actions. Initially, the action determination module 4020 can input vehicle data (i.e., data obtained from the sensor system 4100) into the machine-learned model or rules-based engine. As will be discussed, in some scenarios, the action determination module 4020 may further input infrastructure data or other external data (i.e., vehicle data obtained from other autonomous vehicles) into the machine-learned model or rules-based engine when the action determination module 4020 cannot determine a control action based on the vehicle data alone. In response to the inputted data, the machine-learned model or rules-based engine outputs one or more candidate actions.

Each outputted candidate action may have a confidence score attributed thereto. The confidence score may indicate a degree of confidence in the respective action. For example, a relatively low confidence score (e.g., 0.4 out of 1) that is attributed to a candidate action of turning right when there is an occlusion scenario indicates that the action determination module 4020 is not highly confident in the candidate action.

The autonomous control module 4010 receives the one or more candidate actions and their corresponding confidence scores and determines whether to select one of the candidate actions as a control action. The autonomous control module 4010 can compare each confidence score to a threshold, where the threshold defines a minimum confidence score of a candidate action. The threshold may be determined empirically or in any other suitable manner. If at least one of the confidence scores is greater than (or equal to) the threshold, the autonomous control module 4010 selects a control action from the one or more candidate actions. For instance, the autonomous control module 4010 may select the candidate action having the highest confidence score. Alternatively, the autonomous control module 4010 may select the candidate action having a requisite confidence score and that would least disrupt the motion of the autonomous vehicle. It is noted that in some implementations, the autonomous control module 4010 may determine a control action that does not result in the vehicle advancing past the occlusion scenario. For example, if the vehicle is unable to determine a control action that would advance the vehicle past the occlusion scenario, the autonomous control module 4010 may determine a control action that causes the vehicle to wait longer, to inch forward, or advance very slowly. In these scenarios, the autonomous control module 4010 may consider that it was unable to determine a control action, as the selected control action does not advance the vehicle past the occlusion scenario.

In the event that none of the confidence scores exceeds or equals the threshold and/or the autonomous control module 4010 is unable to determine a control action that advances the vehicle past the occlusion scenario (e.g., wait longer or inch forward), the autonomous control module 4010 requests infrastructure data from an external resource. For example, the autonomous control module 4010 may generate a request for infrastructure data and may transmit the request to the external resource. The autonomous control module 4010 can obtain a geolocation of the vehicle from, for example, a GPS unit of the vehicle. The autonomous control module 4010 may include the geolocation of the vehicle in the request for infrastructure data. In some implementations, the autonomous control module 4010 (or a related component) may estimate a location corresponding to the occlusion scenario. Put another way, the autonomous control module 4010 may estimate a location of the area on which the sensor system 4100 was unable to obtain reliable vehicle data. The autonomous control module 4010 may utilize the geolocation of the autonomous vehicle, the orientation of the autonomous vehicle, and/or the sensor data to estimate the location corresponding to the occlusion scenario. For example, the autonomous control module 4010 can use the geolocation of the vehicle and the sensor readings from a LIDAR sensor of the vehicle to estimate the location of an obstacle that is creating the occlusion scenario. Based on the location of the obstacle and the orientation of the autonomous vehicle, the autonomous control module 4010 may estimate the location of the area on which the sensor system 4100 is unable to obtain reliable vehicle data. In some implementations, the autonomous control module 4010 can include the estimated location of the occlusion scenario in the request for infrastructure data.

In response to transmitting the request for infrastructure data, the autonomous control module 4010 receives infrastructure data from the external resource. The infrastructure data may indicate various information relating to the area that is occluded. For example, the infrastructure data may indicate geolocations of sensors that were recently occupied (e.g., where an object was detected by an infrastructure sensor). In this example, the infrastructure data may further include a time-stamp indicating when the object was detected in the area. Furthermore, depending on the number and configurations of the infrastructure sensors, the infrastructure data may further include velocities of detected objects. Additionally or alternatively, the infrastructure may include video data, radar data, and/or LIDAR data that is obtained from various infrastructure sensors. In these examples, the external resource may stream the video data, radar data, and/or LIDAR data, and this data may include time-stamps that indicate when the data was captured. In some implementations, the external resource structures the infrastructure data in a manner that is ready to be input directly to the action determination module 4020.

In response to receiving the infrastructure data, the autonomous control module 4010 passes the infrastructure data as well as newly acquired vehicle data (since the request was transmitted) to the action determination module 4020. The action determination module 4020 inputs the vehicle data and the infrastructure data into a machine-learned model or a rules-based engine. In response to inputting the infrastructure data and the vehicle data into the machine-learned model or a rules-based engine, the machine-learned model or rules-based engine outputs one or more candidate actions, where each candidate action has a confidence score attributed thereto. The autonomous control module 4010 receives the candidate actions and the corresponding confidence scores, and compares each confidence score to the threshold. If at least one of the confidence scores is greater than (or equal to) the threshold, the autonomous control module 4010 selects a control action from the one or more candidate actions. For instance, the autonomous control module 4010 may select the candidate action having the highest confidence score. Alternatively, the autonomous control module 4010 may select the candidate action having a requisite confidence score and that would least disrupt the motion of the autonomous vehicle. In the event that none of the confidence scores exceeds the threshold, the autonomous control module 4010 may request/wait for updated infrastructure data until the autonomous control module 4010 is able to select a control action. Additionally or alternatively, the autonomous control module 4010 may relinquish control of the autonomous vehicle to a passenger in the vehicle.

In response to selecting a control action, the autonomous control module 4010 outputs the action to the vehicle control module 4030. The vehicle control module 4030 receives a control action and outputs commands to one or more various vehicle systems. For example, in response to receiving a "veer right" action, the vehicle control module 4030 instructs the steering system to turn the steering column of the vehicle slightly to the right. In another example, in response to receiving a "decelerate" action, the vehicle control module 4030 may instruct the power system to reduce the power output by one or more motors of the vehicle. The vehicle control module 4030 may determine commands corresponding to a received action in any suitable manner. For example, the vehicle control module 4030 may utilize a lookup table that relates actions to commands. In other implementations, the vehicle control module 4030 may utilize a set of rules that output one or more commands in response to an action. In response to determining a command, the vehicle control module 4030 issues the command to the corresponding vehicle system.

In some implementations, the autonomous control module 4010 (or another component) may initiate a communication session with the external resource upon the autonomous vehicle powering on. Once established, the autonomous control module 4010 can send requests and receive data from the external resource efficiently. Furthermore, by sending requests for infrastructure data to the external requests, as opposed to continuously receiving infrastructure data, the amount of network bandwidth consumed and computational resources used by the autonomous vehicle are greatly reduced.

Figure 5:
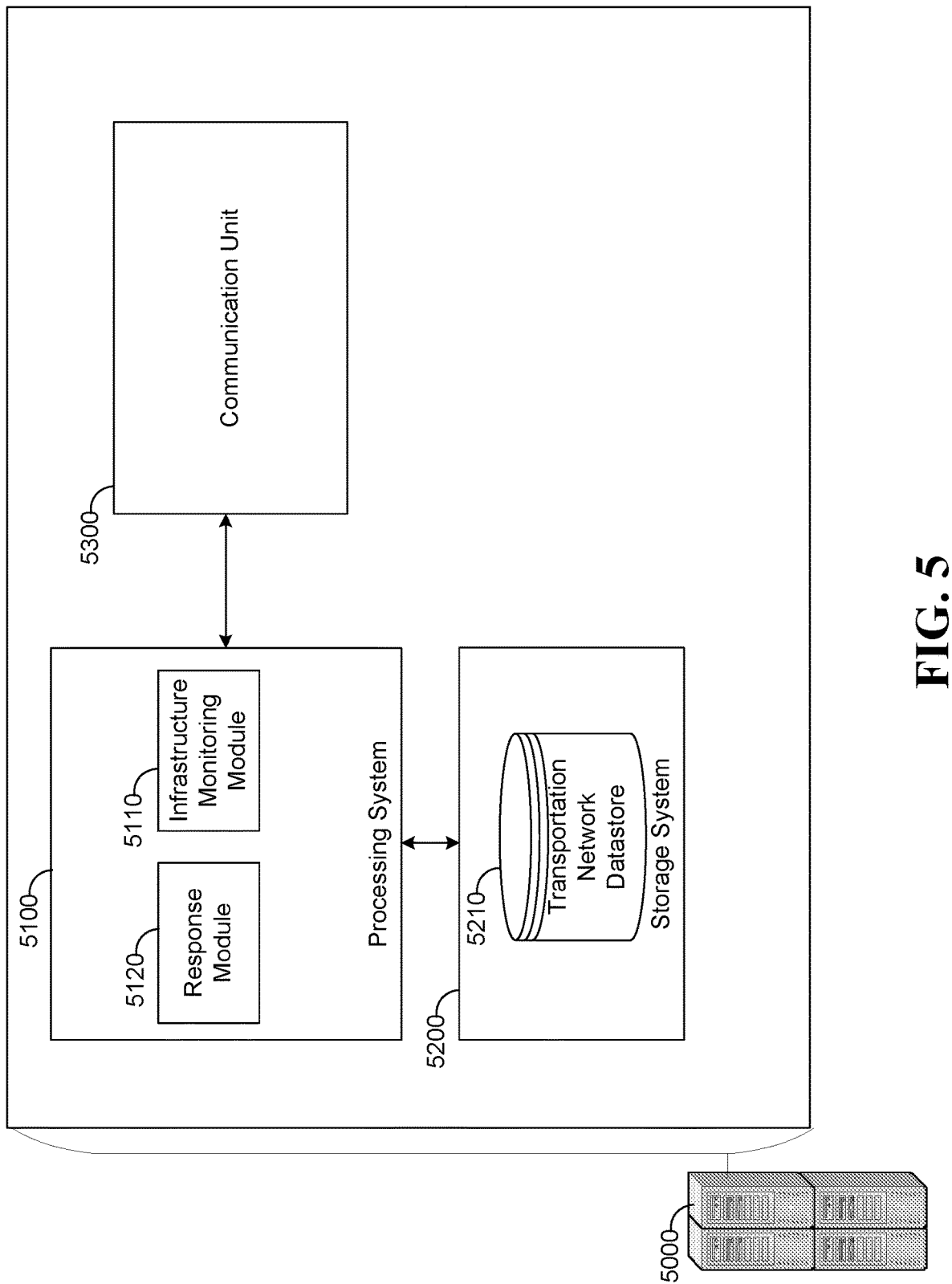
FIG. 5 is a schematic of an example set of components of an external resource that is configured to provide infrastructure data to an autonomous vehicle.

Furthermore, in some implementations, the external resource may further provide external vehicle data in response to the request for infrastructure data. External vehicle data may be data obtained from other autonomous vehicles that are proximate to the autonomous vehicle and in communication with the external resources. This may include time-stamped geolocations of other vehicles in proximity to the autonomous vehicle, velocities of the other vehicles, estimated locations of objects detected by the other vehicles, and the like. FIG. 5 illustrates an example configuration of an external resource 5000 (e.g., the external resource 2400 of FIG. 2). The external resource 5000 may be a vehicle control server that includes a processing system 5100 that includes one or more processors that operate in a distributed or individual manner. The processing system 5100 may execute an infrastructure monitoring module 5110 and a response module 5120. The processing system 5100 may execute additional components not shown.

The external resource 5000 may further include a storage system 5200. The storage system 5200 may include one or more storage devices (e.g., flash memory devices, hard disk drives, or the like). The storage devices may be located at the same physical location as one another or may be distributed and connected via a network. The storage system 5200 may store a transportation network datastore 5210.

The external resource 5000 may further include a communication unit 5300 that effectuates wired and/or wireless communication between one or more external devices (e.g., autonomous vehicles) and the external resource 5000 via a communication network (e.g., the Internet and/or a cellular network).

The transportation network datastore 5210 stores transportation network data. Transportation network data may be any data that describes features of a transportation network. The transportation network data may define roadways (e.g., streets, highways, bi-ways, alleys, etc.), directions of travels along the roadways, right of ways on the roadways, traffic signage (e.g., yield signs, stop signs, etc.), traffic light data, lane data (e.g., number of lanes, merge points, etc.), speed limits along the roadway, expected speeds or velocities along the roadway, ranges of expected speeds or velocities along the roadway, known obstacles, external objects, and other suitable data. In some implementations, the transportation network data may be organized in a database that is keyed by geolocations. In this way, the response module 5120 and/or the infrastructure monitoring module 5110 may retrieve transportation network data relating to a path of a vehicle based on a location of the vehicle.

The transportation network datastore 5210 may further store information relating to infrastructure sensors disposed along the transportation network. Examples of infrastructure sensors include, but are not limited to, video cameras, radar sensors, LIDAR sensors, audio sensors, and inductive-loop traffic sensors. The transportation network datastore 5210 can include geolocations of the respective infrastructure sensors and geolocations or geofences corresponding to the areas monitored by the infrastructure sensors.

In some implementations, the infrastructure monitoring module 5110 monitors the state of infrastructure sensors disposed along the transportation network. For each infrastructure sensor, the infrastructure monitoring module 5110 may communicate or effectuate communication with the infrastructure sensor and may maintain the state (e.g., an occupancy history) of the sensor. In some implementations, the infrastructure monitoring module 5110 is configured to determine whether the area being monitored by a respective sensor is occupied by an object or is vacant. In some of these implementations, an infrastructure sensor (e.g., an inductive-loop traffic sensor) may communicate an occupancy signal with the infrastructure monitoring module 5110, where one value (e.g., one) indicates that the area being monitored by the infrastructure sensor is occupied and a second value (e.g., zero) indicates that the area being monitored by the infrastructure sensor is vacant. Each time the signal indicates that the area being monitored is occupied, the infrastructure monitoring module 5110 may determine a time-stamp corresponding to the occupancy event.

For each infrastructure sensor, the infrastructure monitoring module 5110 may maintain an occupancy history of the sensor for during a monitoring period (e.g., the previous minute or the previous thirty seconds). The occupancy history may indicate all the occupancy events detected during the monitoring period. For example, the occupancy history may include the time-stamps of each occupancy event detected during the monitoring period. The infrastructure monitoring module 5110 may purge any occupancy events that are no longer in the monitoring period. For example, as an occupancy event becomes stale (e.g., more than one minute old), the infrastructure monitoring module 5110 may remove the occupancy event from the occupancy history of the infrastructure sensor.

Additionally or alternatively, the infrastructure monitoring module 5110 may maintain speed/velocity information for each object detected by an infrastructure sensor, provided an infrastructure sensor or a collection of infrastructure sensors can collect such information. For example, if the infrastructure sensor is a LIDAR or radar sensor, the infrastructure sensor may be able to determine a speed of the vehicle. The infrastructure sensor may transmit this information to the external resource. The infrastructure monitoring module 5110 may receive the speed/velocity information of a detected object and may maintain the speed of the vehicle with the occupation history.

In addition to maintaining an occupancy history, the infrastructure monitoring module 5110 may maintain a reliability score of each respective infrastructure sensor. A reliability score may indicate a degree of liability of a respective infrastructure sensor. For instance, if a sensor is consistently providing readings that are inconsistent with other nearby infrastructure sensors (e.g., the sensor is consistently outputting occupancy signals that indicate an area is not occupied, while other infrastructure sensors before and after the sensor output contradictory occupancy signals), then the reliability score of the sensor may be reduced. The reliability score may impact the decision making of an autonomous vehicle if the reliability score of the sensor is relatively low compared to reliability scores of other infrastructure sensors.

The infrastructure monitoring module 5110 may maintain the state (e.g., occupancy history) of each respective infrastructure in any suitable manner. For example, the infrastructure monitoring module 5110 may instantiate a respective infrastructure sensor object (e.g., a container) for each respective infrastructure. Each infrastructure sensor object may be configured to communicate with its respective infrastructure sensor directly via the communication unit. Each infrastructure sensor object may further include instructions for generating time-stamps in response to detecting an occupancy event and for maintaining the occupancy history of the respective infrastructure sensor based on the detected occupancy events. Furthermore, the infrastructure sensor objects may be further configured to respond to queries for their respective occupancy history. In response to such a query, the infrastructure sensor object may output its occupancy history.

The infrastructure sensor objects may be configured to perform additional functions. For example, the infrastructure sensor objects may be configured to structure the collected infrastructure data to indicate the time-stamp of each occupancy event, the type of infrastructure sensor that captured the occupancy event, and the geolocation of the detected occupancy event. In another example, one or more infrastructure sensor objects may be configured to intercommunicate with one another to interpolate more complex infrastructure data. For example, two or more infrastructure sensor objects corresponding to two or more infrastructure sensors in proximity to one another may be configured to communicate to determine when an object travels between the two or more sensors. In this example, the infrastructure sensor objects may determine a velocity of an object based on the distance between the infrastructure sensors and the respective time-stamps of the occupancy events detected at the respective infrastructure sensors.

The response module 5120 may be configured to respond to requests from autonomous vehicles traveling on the transportation network. For each autonomous vehicle traveling along the transportation network, the response module 5120 may create a communication session to effectuate communication between the external resource 5000 and the respective autonomous vehicle. Upon creating the communication session, the response module 5120 may receive requests (or other communications) from an autonomous vehicle and may transmit data (e.g., infrastructure data) to the autonomous vehicle.

In some implementations, the response module 5120 is configured to receive requests for infrastructure data from autonomous vehicles and to return infrastructure data that is responsive to the request. In some of these implementations, the response module 5120 receives a request for infrastructure data and determines which infrastructure sensors are relevant to the request. As discussed, a request for infrastructure data may contain a geolocation of the autonomous vehicle, an estimated location corresponding to an occlusion scenario, and/or other information (e.g., a current path of the autonomous vehicle). The response module 5120 may query the transportation network datastore 5210 using the geolocation of the vehicle and/or the estimated location of the occlusion scenario to determine which, if any, infrastructure sensors are relevant to the geolocation of the vehicle/location of the occlusion scenario. The transportation network datastore 5210 may return identifiers of zero or more relevant infrastructure sensors.

In response to determining the relevant infrastructure sensors, the response module 5120 may obtain the infrastructure data corresponding to the relevant infrastructure sensors. In some implementations, the response module 5120 may query the corresponding infrastructure sensor objects of each respective relevant infrastructure sensor to obtain the occupancy history (or any other infrastructure data) of each respective relevant infrastructure sensor. The response module 5120 may transmit the occupancy history to the autonomous vehicle via the open communications session. In some implementations, the response module 5120 may continue to transmit occupancy data for the relevant infrastructure sensors until the autonomous vehicle has bypassed the occlusion scenario. Upon the autonomous vehicle reaching its destination and/or powering off, the response module 5120 may end the communication session with the autonomous vehicle.

Figure 6:
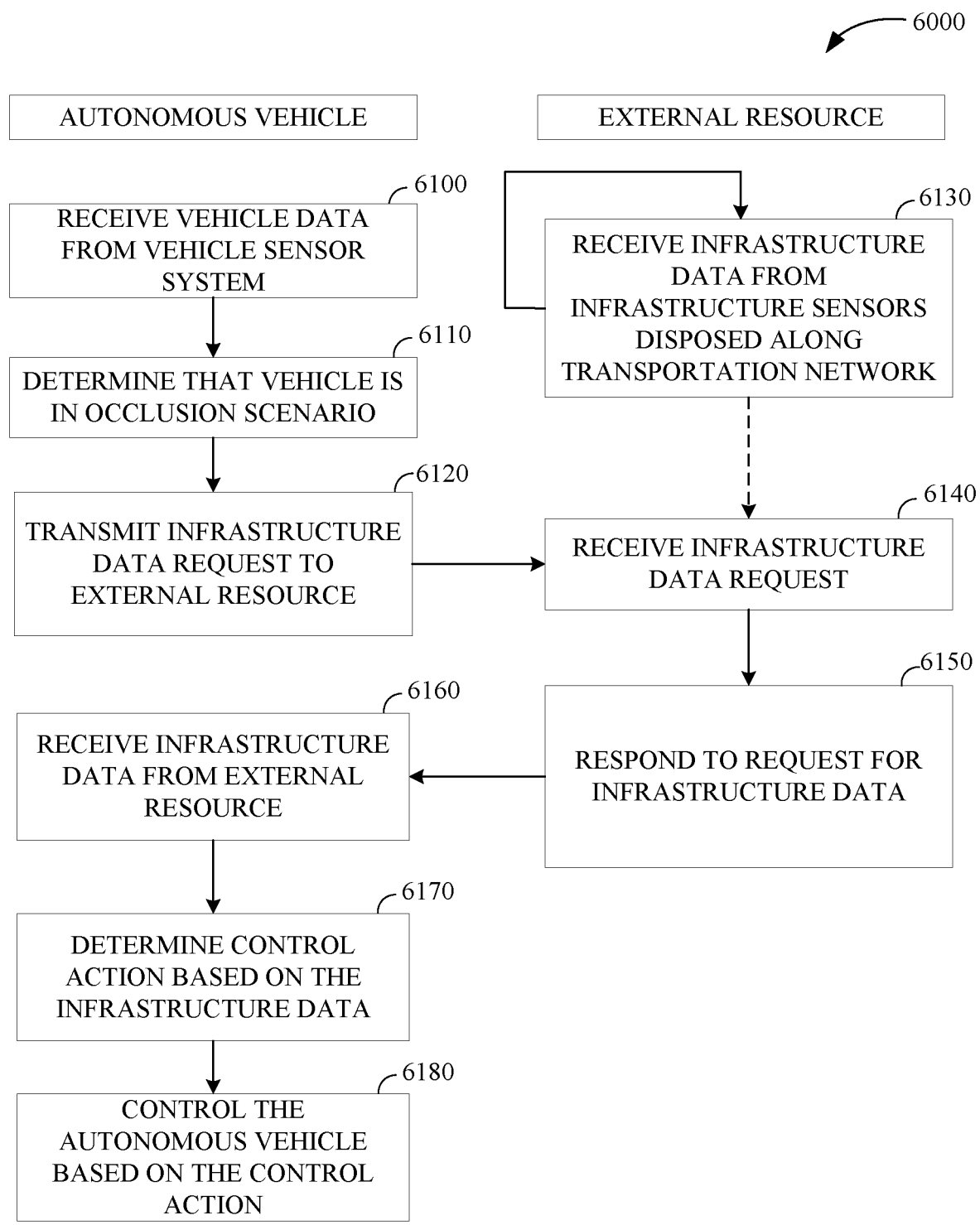
FIG. 6 is a flow chart illustrating an example set of operations of a method for controlling an autonomous vehicle that has encountered an occlusion scenario.

FIG. 6 illustrates an example set of operations of a method 6000 for controlling an autonomous vehicle (e.g., the autonomous vehicle 1000 of FIG. 1) using infrastructure data obtained from an external resource (e.g., the external resource 5000 of FIG. 5).

At 6100, the autonomous vehicle receives vehicle data from the sensor system of the autonomous vehicle. For example, the autonomous vehicle may receive one or more sensor signals from one or more sensors disposed in the vehicle. Examples of types of sensors include, but are not limited to, video cameras, audio sensors, LIDARS, radars, motion sensors, accelerometers, and/or gyroscopes. The autonomous vehicle may continuously collect vehicle data as the vehicle is traversing a transportation network.

At 6110, the autonomous vehicle determines that it is in an occlusion scenario based on the vehicle data. As discussed, an occlusion scenario may occur when an obstacle is blocking the "field of view" of the sensor system of the vehicle. The autonomous vehicle may determine that the autonomous vehicle is in an occlusion scenario when the autonomous vehicle is unable to determine a control action based on the current vehicle data. For example, the autonomous vehicle may utilize a machine-learned model or a rules-based engine to determine one or more candidate actions. Initially, the autonomous vehicle may input the vehicle data into the machine-learned model or rules-based engine, which in turn output one or more candidate actions. Each candidate action may have a confidence score attributed thereto. The autonomous vehicle may compare each confidence score to a threshold. If none of the candidate scores exceeds the threshold, the autonomous vehicle may determine that it is in an occlusion scenario. The autonomous vehicle may determine that it is in an occlusion scenario in other suitable manners as well. For instance, the autonomous vehicle may compare an image captured from one perspective of the vehicle and LIDAR data corresponding to the same perspective to determine if there is an obstacle that is hindering the "field of view" of the vehicle.

At 6120, in response to determining that the vehicle is in an occlusion scenario, the autonomous vehicle transmits a request for infrastructure data to the external resource (e.g., the external resource 5000 of FIG. 5). The request for infrastructure data may include a geolocation of the autonomous vehicle and/or an estimated location corresponding to the occlusion scenario (e.g., an estimated location of the occluded area). The autonomous vehicle can obtain a geolocation of the vehicle from, for example, a GPS unit of the vehicle. The autonomous vehicle may include the geolocation of the vehicle in the request for infrastructure data. In some implementations, the autonomous vehicle may estimate a location corresponding to the occlusion scenario. Put another way, the autonomous vehicle may estimate a location of the area on which the sensor system was unable to obtain reliable vehicle data. The autonomous vehicle may utilize the geolocation of the autonomous vehicle, the orientation of the autonomous vehicle, and/or the vehicle data to estimate the location corresponding to the occlusion scenario. For example, the autonomous vehicle can use the geolocation of the vehicle and the sensor readings from a LIDAR of the vehicle to estimate the location of an obstacle that is creating the occlusion scenario. Based on the location of the obstacle and the orientation of the autonomous vehicle, the autonomous vehicle may estimate the location of the area on which the sensor system is unable to obtain reliable vehicle data. In some implementations, the autonomous vehicle can include the estimated location of the occlusion scenario in the request for infrastructure data. The autonomous vehicle may transmit the request for infrastructure data to the external resource via a communication network (e.g., the Internet and/or a cellular network). In some implementations, the autonomous vehicle may transmit the request for infrastructure data via a communication session that is established between the autonomous vehicle and the external resource.

At 6130, the external resource receives infrastructure data from infrastructure sensors disposed along the transportation network. Examples of infrastructure sensors include, but are not limited to, video cameras, radar sensors, LIDAR sensors, audio sensors, and inductive-loop traffic sensors. Each infrastructure sensor may be configured to communicate with the external resource via the communication network. In some implementations, an infrastructure sensor may be configured to transmit an occupancy signal that indicates whether an area being monitored by the infrastructure is currently occupied by an object (e.g., a vehicle, pedestrian, cyclist, etc.). In some implementations, an infrastructure sensor may transmit raw sensor data (e.g., video stream, LIDAR stream, radar stream, etc.) to the external resource. In these implementations, the external resource may be configured to determine whether the area being monitored by the sensor is occupied by an object. The external resource may continuously receive the infrastructure data from the infrastructure sensors.

The external resource may maintain a state of each infrastructure sensor. In some implementations, the external resource maintains an occupancy history of each infrastructure sensor. Each occupancy history may be temporally limited to the recent history of the infrastructure sensor (e.g., the previous minute or thirty seconds). In some implementations, the external resource may execute/maintain an infrastructure sensor object for each respective infrastructure sensor. Each infrastructure sensor object may be configured to communicate with its respective infrastructure sensor directly via the communication unit. Each infrastructure sensor object may further include instructions for generating time-stamps in response to detecting an occupancy event and instructions for maintaining the occupancy history of the respective infrastructure sensor based on the detected occupancy events. Furthermore, the infrastructure sensor objects may be further configured to respond to queries for their respective occupancy history. In response to such a query, the infrastructure sensor object may output its occupancy history. In some implementations, the infrastructure sensor objects may be configured to structure the collected infrastructure data to indicate the time-stamp of each occupancy event, the type of infrastructure sensor that captured the occupancy event, and the geolocation of the detected occupancy event.

In some implementations, one or more infrastructure sensor objects may be configured to intercommunicate with one another to interpolate more complex infrastructure data. For example, two or more infrastructure sensor objects corresponding to two or more infrastructure sensors in proximity to one another may be configured to communicate to determine when an object travels between the two or more sensors. In this example, the infrastructure sensor objects may determine a velocity of an object based on the distance between the infrastructure sensors and the respective time-stamps of the occupancy events detected at the respective infrastructure sensors.

At 6140, the external resource receives a request for infrastructure data from an autonomous vehicle. The external resource may receive the request via the communication network. In some implementations, the external resource opens a communication session with each autonomous vehicle that is configured to communicate with the external resource and traversing the transportation network. The external resource may receive requests for infrastructure data (and other communications) via the communication session.

At 6150, the external resource responds to the request for infrastructure data. In some implementations, the external resource determines one or more infrastructure sensors that are relevant to the request. As discussed, a request for infrastructure data may contain a geolocation of the autonomous vehicle, an estimated location corresponding to an occlusion scenario, and/or other information (e.g., a current path of the autonomous vehicle). The external resource may query a datastore (e.g., the transportation network datastore 5210 of FIG. 5) using the geolocation of the vehicle and/or the estimated location of the occlusion scenario to determine which, if any, infrastructure sensors are relevant to the geolocation of the vehicle and/or the location of the occlusion scenario. The datastore may return identifiers of zero or more relevant infrastructure sensors.

In response to determining the relevant infrastructure sensors, the external resource may obtain the infrastructure data corresponding to the relevant infrastructure sensors. In some implementations, the external resource may query the corresponding infrastructure sensor objects of each respective relevant infrastructure sensor to obtain the occupancy history (or any other infrastructure data) of each respective relevant infrastructure sensor. The external resource may transmit the occupancy history of each relevant infrastructure sensor to the autonomous vehicle via the open communication session.

At 6160, the autonomous vehicle receives infrastructure data from the external resource. In some implementations, the infrastructure data includes occupancy history of one or more infrastructure sensors that are proximate or relevant to the geolocation of the autonomous vehicle and/or the occlusion scenario.

At 6170, the autonomous vehicle determines a control action based on the received infrastructure data. In response to receiving the infrastructure data, the autonomous vehicle may input the vehicle data and the infrastructure data into a machine-learned model or a rules-based engine. In response to inputting the infrastructure data and the vehicle data into the machine-learned model or a rules-based engine, the machine-learned model or rules-based engine outputs one or more candidate actions, where each candidate action has a confidence score attributed thereto. In some implementations, the autonomous vehicle compares each confidence score to the threshold. If at least one of the confidence scores is greater than (or equal to) the threshold, the autonomous vehicle selects a control action from the one or more candidate actions. For instance, the autonomous vehicle may select the candidate action having the highest confidence score. Alternatively, the autonomous vehicle may select the candidate action having a requisite confidence score and that would least disrupt the motion of the autonomous vehicle. In the event that none of the confidence scores exceeds the threshold, the autonomous vehicle may request/wait for updated infrastructure data. Additionally or alternatively, the autonomous vehicle may relinquish control of the autonomous vehicle to a passenger in the vehicle.

At 6180, the autonomous vehicle controls itself based on the selected control action. In response to selecting a control action, the autonomous vehicle determines one or more commands to one or more various vehicle systems based on the control action. The autonomous vehicle may determine commands corresponding to a received action in any suitable manner. For example, the autonomous vehicle may utilize a lookup table that relates actions to commands or a set of rules that output one or more commands in response to an action. In response to determining a command, the autonomous vehicle issues the command to the corresponding vehicle system.

It is noted that the autonomous vehicle and the external resource may continue to receive/transmit infrastructure data (e.g., occupancy history) for the relevant infrastructure sensors until the autonomous vehicle has bypassed the occlusion scenario. The method 6000 may continue to execute until the autonomous vehicle reaches its destination and/or powers off. Upon the autonomous vehicle reaching its destination and/or powering off, the external resource may end the communication session with the autonomous vehicle.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for controlling an autonomous vehicle traversing a transportation network comprising:
    traversing, by the autonomous vehicle, the transportation network in accordance with a route;
    receiving, by one or more processors of the autonomous vehicle, vehicle sensor data from one or more vehicle sensors of the autonomous vehicle;
    determining, by the one or more processors, that the autonomous vehicle has encountered an occlusion scenario based on the vehicle sensor data, wherein a field of view of at least one sensor from the one or more vehicle sensors is occluded such that a corresponding portion of the transportation network is an occluded portion, wherein determining that the autonomous vehicle has encountered an occlusion scenario comprises:
        determining one or more candidate actions based on the vehicle sensor data, each candidate action having a respective confidence score attributed thereto that indicates a degree of confidence in the candidate action given the vehicle sensor data;
        comparing the respective confidence score of each candidate action to a threshold;
        in response to determining that all of the respective confidence scores are less than the threshold, determining that the autonomous vehicle has entered the occlusion scenario; and
        in response to determining that a particular confidence score of the respective confidence scores is greater than the threshold:
            selecting a candidate action to which the particular confidence score corresponds as the control action; and
            in response to determining that the control action does not advance the autonomous vehicle past a current scenario, determining that the vehicle is in the occlusion scenario; and
    in response to determining that the autonomous vehicle has encountered the occlusion scenario:
        transmitting, by the one or more processors, a request for infrastructure data to an external resource via a communication network, the request for infrastructure data indicating a geolocation of the autonomous vehicle;
        receiving, by the one or more processors, a response to the request, the response including infrastructure data from the external resource, the infrastructure data being based on infrastructure sensor data providing one or more infrastructure sensors disposed along the transportation network that are proximate to the geolocation of the autonomous vehicle, the infrastructure data indicating an external object in the occluded portion of the transportation network;

determining, by the one or more processors, a control action for the autonomous vehicle to perform based on the infrastructure data and the vehicle sensor data; and controlling, by the one or more processors, the autonomous vehicle based on the control action.

2. The method of claim 1, wherein determining the control action comprises:

inputting the vehicle sensor data and the infrastructure data into a machine-learned model that is trained to output candidate actions in response to receiving input data, wherein each candidate action has a respective confidence score associated therewith.

3. The method of claim 2, wherein each instance of infrastructure data has a sensor reliability score attributed thereto indicating a degree of reliability of the infrastructure sensor that output the infrastructure data, and wherein determining the control action further comprises inputting the sensor reliability score of each instance of the infrastructure data into the machine-learned model with the instance of infrastructure data.

4. The method of claim 2, wherein each instance of infrastructure data includes location data, wherein the location data indicates a location of the infrastructure sensor that transmitted the instance of infrastructure data, and wherein determining the control action further comprises inputting the location data of each instance of the infrastructure data into the machine-learned model with the instance of infrastructure data.

5. The method of claim 1, further comprising:

in response to determining that the autonomous vehicle has encountered the occlusion scenario:

determining an approximate location of the occluded portion of the transportation network based on the vehicle sensor data; and including the approximate location in the request for infrastructure data.

6. An autonomous vehicle comprising:

a sensor system having one or more vehicle sensors;

one or more processors that execute computer-readable instructions that cause the one or more processors to:

receive vehicle sensor data from the one or more vehicle sensors of the sensor system as the autonomous vehicle traverses a transportation network;

determine that the autonomous vehicle has encountered an occlusion scenario based on the vehicle sensor data, wherein a field of view of at least one sensor from the one or more vehicle sensors is occluded such that a corresponding portion of the transportation network is an occluded portion,wherein determining that the autonomous vehicle has encountered an occlusion scenario comprises:

determining one or more candidate actions based on the vehicle sensor data, each candidate action having a respective confidence score attributed thereto that indicates a degree of confidence in the candidate action given the vehicle sensor data;

comparing the respective confidence score of each candidate action to a threshold;

in response to determining that all of the respective confidence scores are less than the threshold, determining that the autonomous vehicle has entered the occlusion scenario; and in response to determining that a particular confidence score of the respective confidence scores is greater than the threshold:

selecting a candidate action to which the particular confidence score corresponds as the control action; and in response to determining that the control action does not advance the autonomous vehicle past a current scenario, determining that the vehicle is in the occlusion scenario; and in response to determining that the autonomous vehicle has encountered the occlusion scenario:

transmit a request for infrastructure data to an external resource via a communication network, the request for infrastructure data indicating a geolocation of the autonomous vehicle;

receive a response to the request, the response including infrastructure data from the external resource, the infrastructure data being based on infrastructure sensor data provided by one or more infrastructure sensors disposed along the transportation network that are proximate to the geolocation of the autonomous vehicle, the infrastructure data indicating an external object in the occluded portion of the transportation network;

determine a control action for the autonomous vehicle to perform based on the infrastructure data and the vehicle sensor data; and control the autonomous vehicle based on the control action.

7. The autonomous vehicle of claim 6, wherein determining the control action comprises:

inputting the vehicle sensor data and the infrastructure data into a machine-learned model that is trained to output candidate actions in response to receiving input data, wherein each candidate action has a respective confidence score associated therewith.

8. The autonomous vehicle of claim 7, wherein each instance of infrastructure data has a sensor reliability score attributed thereto indicating a degree of reliability of the infrastructure sensor that output the infrastructure data, and wherein determining the control action further comprises inputting the sensor reliability score of each instance of the infrastructure data into the machine-learned model with the instance of infrastructure data.

9. The autonomous vehicle of claim 7, wherein each instance of infrastructure data includes location data, wherein the location data indicates a location of the infrastructure sensor that transmitted the instance of infrastructure data, and wherein determining the control action further comprises inputting the location data of each instance of the infrastructure data into the machine-learned model with the instance of infrastructure data.

10. The autonomous vehicle of claim 6, wherein the computer-readable instructions further cause the one or more processors to:

in response to determining that the autonomous vehicle has encountered the occlusion scenario:

determine an approximate location of the occluded portion of the transportation network based on the vehicle sensor data; and include the approximate location in the request for infrastructure data.

* * * * *